United States Patent

Motominami et al.

[11] Patent Number: 5,232,083
[45] Date of Patent: Aug. 3, 1993

[54] CAN CONVEYING APPARATUS

[75] Inventors: Yutaka Motominami; Kouji Terai; Masao Iguchi, all of Ishikawa, Japan

[73] Assignee: Daido Kogyo Co., Ltd., Kaga, Japan

[21] Appl. No.: 957,795

[22] Filed: Oct. 8, 1992

[30] Foreign Application Priority Data

Oct. 8, 1991 [JP] Japan ................. 3-90574[U]

[51] Int. Cl.⁵ ............................................ B65G 47/04
[52] U.S. Cl. ................................ 198/803.12; 198/719
[58] Field of Search ............... 198/487.1, 719, 803.12, 198/851

[56] References Cited

U.S. PATENT DOCUMENTS

| | | | |
|---|---|---|---|
| 3,067,861 | 12/1962 | Johnson | 198/803.12 X |
| 4,032,185 | 6/1977 | Peyton | 198/803.12 X |
| 4,129,206 | 12/1978 | Talbot | 198/803.12 X |
| 4,388,990 | 6/1983 | Michalik | 198/719 X |
| 4,533,039 | 8/1985 | Grims | 198/719 X |
| 4,880,108 | 11/1989 | Burk | 198/487.1 X |
| 4,927,002 | 5/1990 | Springman | 198/487.1 |
| 4,927,205 | 5/1990 | Bowler et al. | 198/803.12 X |
| 4,930,620 | 6/1990 | Springman | 198/803.12 X |

FOREIGN PATENT DOCUMENTS

| | | | |
|---|---|---|---|
| 2234115 | 1/1974 | Fed. Rep. of Germany | 198/803.12 |
| 0037611 | 2/1986 | Japan | 198/803.12 |
| 1196858 | 7/1970 | United Kingdom | 198/803.12 |

Primary Examiner—D. Glenn Dayoan
Attorney, Agent, or Firm—Wenderoth, Lind & Ponack

[57] ABSTRACT

The can conveying apparatus is provided with a conveying part composed of a pin extending at a predetermined pitch from a chain, a shock absorbing member having a central hole to receive and be fitted onto the end portion of the conveying part by a stopper, a spring interposed between the bottom of the hole of the shock absorbing member and the conveying part under a certain pressure, and a space arranged between the end portion of the conveying part and the bottom of the hole to allow the shock absorbing member to longitudinally move together with the spring compressed. The hole of the shock absorbing member has a cylindrical hole to contain the spring, and a smaller-diameter hole wherein the conveying part is inserted slidably, and there is provided a clearance to permit the shock absorbing member to be biased while compressing the spring. Accordingly, if shock acts on the can longitudinally as it is hanged on the conveying part, the shock will be absorbed because the shock absorbing member moves longitudinally while pressurizing the spring. If shock is given to the can laterally by a rickety chain when the can is hanged on the conveying part, the shock will be absorbed because the shock absorbing member is biased, compressing the spring.

7 Claims, 3 Drawing Sheets

CAN CONVEYING APPARATUS

BACKGROUND OF THE INVENTION

1. Field of the Invention

This invention relates to a can conveying apparatus using a chain, and more particularly, to a can conveying apparatus using a chain provided with conveying parts to hang and convey cans for beverage, beer, food and so on.

2. Description of the Prior Art

Recently, a can conveying apparatus using a chain is much used in the making and filling of cans with juice or beer.

A can conveying apparatus 1, as shown in FIG. 5, has a conveying part 3 consisting of a pin extending at a certain pitch from a roller chain 2 to convey a can 5 hanged from the conveying part 3. This apparatus is very simple in structure though it is of much use because the can itself is so light that it can be hanged from the conveying part as the chain 2 is set around a sprocket.

The conventional can conveying apparatus, however, only has an extending pin at a suitable pitch from the chain to form the conveying part 3, and conveys the can hanged directly on the steel conveying part 3. Therefore, if the can is made of aluminium softer than the steel conveying part, it may be damaged. If the chain 2 is elongated during use and goes rickety, this may give shock and promote damage to the can.

There is a modified case where the above conveying part is covered at the top with a plastic cap so as not to touch a can directly. However, the conveying part is merely covered with the plastic cap closely, and this may give shock to the bottom of the can and deform or damage it when the can is hanged on the conveying part.

SUMMARY OF THE INVENTION

It is therefore an object of the present invention to solve the problems noted above and to prevent a conveyed can from damage and the bottom of the can from deformation.

It is furthermore another object of the present invention to hang a can onto a conveying part firmly and to prevent the can from falling during conveyance.

It is another, more particular object of the present invention to prevent a chain used in a can conveying apparatus running in a high temperature furnace from being elongated and going rickety during use, thus preventing a can from falling and damage due to the rickety chain.

The can conveying apparatus according to the present invention is provided with a conveying part composed of a pin extending at a specified pitch from a chain, a shock absorbing member having a central hole where the end portion of the conveying part is inserted and connected with the hole by a stopper, a spring inserted between the bottom of the hole of the shock absorbing member and the conveying part under a certain pressure, and a space provided between the end portion of the conveying part and the bottom of the hole to permit the shock absorbing member to axially move together with the spring compressed.

The hole of the shock absorbing member is cylindrical where the spring is housed and a smaller in diameter where the conveying part is inserted slidably, and there is a clearance to permit the shock absorbing member to be biased according to the spring pressed.

As seen from the above, the can conveying apparatus of the present invention enables the shock absorbing member to axially move biasedly together with the spring compressed and absorb shock which acts axially on a can as it is hanged onto the conveying part. In addition, even if shock is given laterally to the can, when it is hanged onto the conveying part, because of the rickety chain, such shock may be absorbed similarly with the shock absorbing member which is biased in response to the spring compressed.

DETAILED DESCRIPTION OF THE PREFERRED EMBODIMENTS

Figure 1:
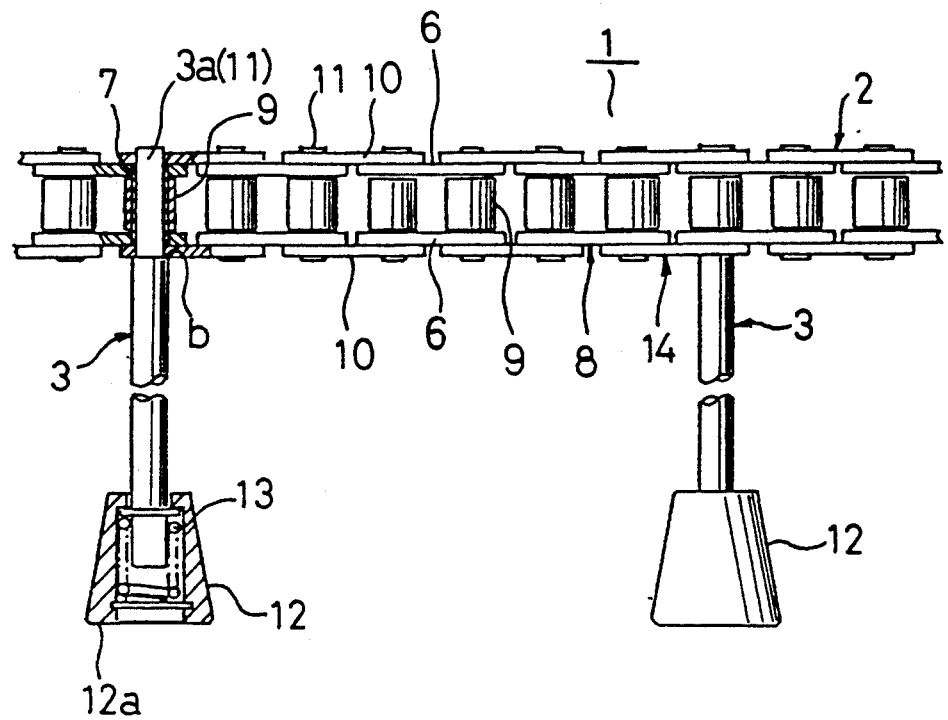
FIG. 1 is a partially sectioned plane view of a can conveying apparatus according to the present invention.
Figure 2:
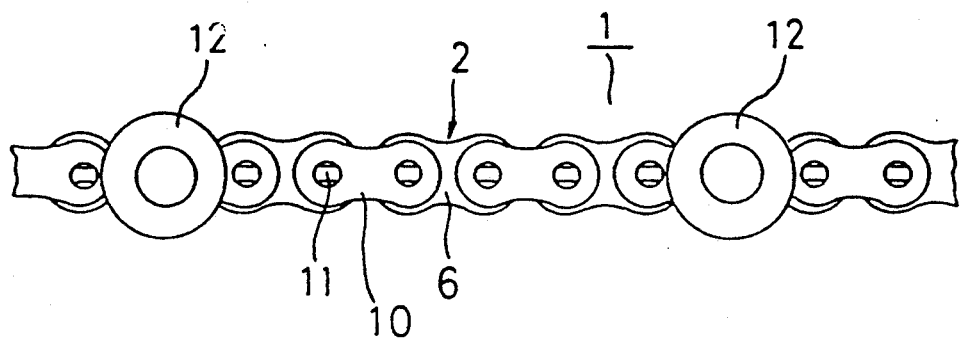
FIG. 2 is an elevation of the can conveying apparatus.
Figure 3:
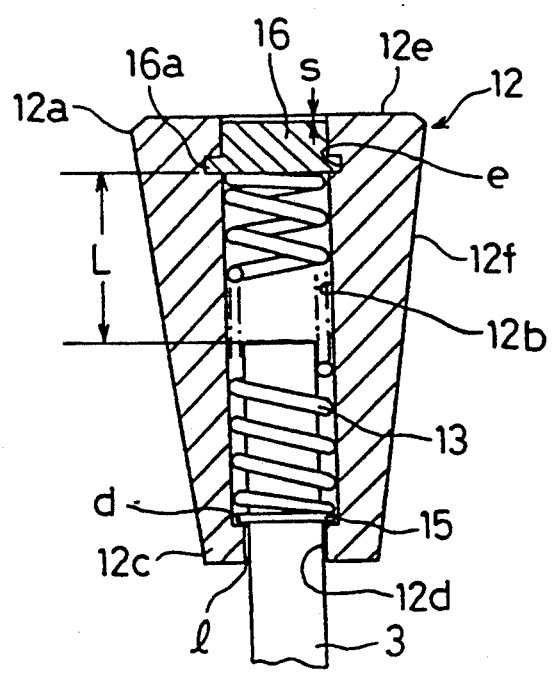
FIG. 3 is a sectional view showing a shock absorbing member fitted onto the end portion of a conveying part of the can conveying apparatus.

As shown in FIGS. 2 and 3, a chain used in a can conveying apparatus is almost the same as a conventional power transmission roller chain 2. It has an inner link 9 wherein right and left inner link plates 6, 6 are coupled by means of bushes 7 with each other at their front and rear ends, and wherein a roller 9 is fitted rotatably onto the bush. The can conveying apparatus has an outer link plate 14 wherein right and left outer link plates 10, 10 are coupled with each other at their front and rear ends by means of pins 11. It connects a plurality of the outer links and a plurality of the inner links alternatively by inserting the pin into the bush hole to form an endless chain.

A conveying part 3 comprises a pin (11), a rod member, extending at predetermined pitch by the inner link and outer link 14. The conveying part 3 is reduced at its base, pinning the chain 2 with a step b of the reduced portion 3a and a split pin or snap ring fitted onto the base end. On the other hand, there is fitted a shock absorbing member 12 onto the rod member at its end. The shock absorbing member 12 is made of plastics, elastomer such as hard heat-resistant rubber, or soft material, and its profile is a truncated cone. The rod member 3 is fitted by way of a spring 13 onto the shock absorbing member 12 so that its larger diameter 12a faces the end of the rod member 3.

As detailed in FIG. 3, the shock absorbing member 12 has a cylindrical hole 12b extending from the larger diameter 12a and a smaller-diameter hole 12d extending from the smaller diameter 12c. The holes are concentric with each other. The rod member 3 goes through the smaller-diameter hole 12d, reaching the middle of the cylindrical hole 12b. A washer 15 is engaged with a groove in the rod member 3 and contacts with a step d of the smaller-diameter hole 12d to prevent the rod member from coming off.

The spring 13 coils round the rod member 3 in the cylindrical hole 12b and extends over the end of the rod member 3 to cover the almost the same length. A cap 16 is engaged with the front end of the hole 12 and presses the spring 13 under a certain pressure, thereby the step d of the smaller-diameter hole 12d engages with the washer 15, keeping the shock absorbing member 12 in position as against the rod member 3.

The way to fit the shock absorbing member is as follows:

First, the rod member 3 is inserted in the shock absorbing member 12 from the smaller-diameter hole 12 until it goes through the cylindrical hole 12b. The washer 15 is fitted onto the rod member 3 where it projects from the hole 12b, and the coil spring onto the rod member 3. With this, the shock absorbing member 12 is moved till the washer 15 meets the step d of the hole 12d, and the cylindrical hole 12b is covered with the cap 16. Since the cylindrical hole 12b has a circular groove e, and the cap 16 has a circular brim 16a, it is possible to fit the brim 16a in the groove e, and the metallic cap 16 onto the hole 12b.

With the cap 16 fitted onto the hole 12b, the exterior of the cap 16 is slightly concave in the cylindrical hole 12b, namely it is a little more concave than the shock absorbing member edge 12e by depth s. It doesn't therefore happen that the bottom of the can touches directly the cap 16 made of metal.

When the shock absorbing member 12 is fitted onto the rod member 3, there is a certain space L between the top end of the rod member 3 and the cap 16, and this makes it possible for the shock absorbing member 12 to move longitudinally along the rod member 3 while compressing the spring 13. There is also formed a rather big clearance between the smaller-diameter hole 12d of the shock absorbing member 12 and the rod member 3, and this makes it possible for the shock absorbing member 12 to move laterally, biasing the spring 13.

The can conveying apparatus 1 runs with the roller chain 2 set around a sprocket (not shown), and the can 5 hanged onto the conveying part 3 provided on the roller chain 2 goes together with the chain 2. Since the conveying part 3 has the truncated cone shock absorbing member 12 at its top, and a side 12f of the shock absorbing member 12 is on the down grade toward the chain 2, the can 5 comes into contact with the side 12f to be hanged onto the conveying part. In addition, as the shock absorbing member 12 is made of an easily fittable material with a high friction coefficient such as elastomer, the can 5 will not drop even if the chain gets shocked. Even if inertia acts on the can 5, giving shock to the conveying part 3 when the can 5 is hanged onto the conveying part 3, and any shock is caused when the can bottom hits against the edge 12e of the shock absorbing member 12 will be absorbed because the shock absorbing member moves axially while compressing the spring 13. Furthermore, any shock caused when the inside of the can hits against the side 12f, will be absorbed because the shock absorbing member moves inclinedly while biasing the spring 13. Additionally, since the shock absorbing member 12 itself is made of elastomer or some soft material, it is possible to prevent the bottom of the can from deformation and the side from damage. The shock absorbing member operates well for a long period of time because the spring 13 positioned in the cylindrical hole 12b is free from oil, dust or paint in the painting process, ensuring that the spring 13 is compressed and the rode member 13 slides into the smaller-diameter hole 12d in a proper manner. It happens that this can conveying apparatus is applied to the the drying or pasteurizing of cans and zigzags in a high-temperature furnace, such as a drying one. If this is the case, the chain will be prone to be elongated and give shock to the cans, and it is needed to lubricate the chain to control its elongation. Lubricating the chain with a lot of oil may cause oil splashed from the chain to get onto the can, which will give rise to a serious problem with cans to contain any beverage. Bushes made of oil immersed sintered metal may be used, but there is left something to be desired in terms of the durability of chain to operate in a high-temperature furnace.

Figure 4:
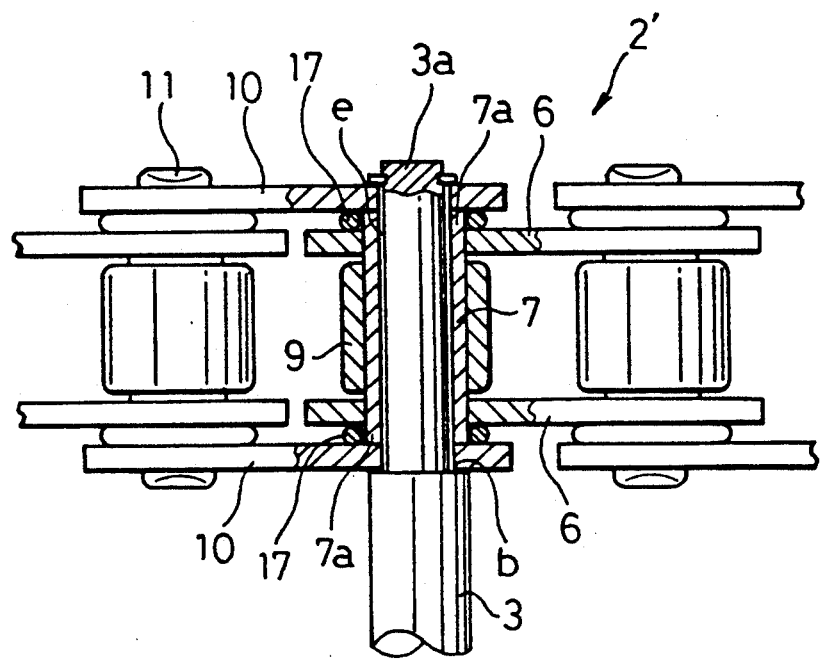
FIG. 4 is an elevation of a preferred chain used in the can conveying apparatus running in a high temperature furnace.
Figure 5:
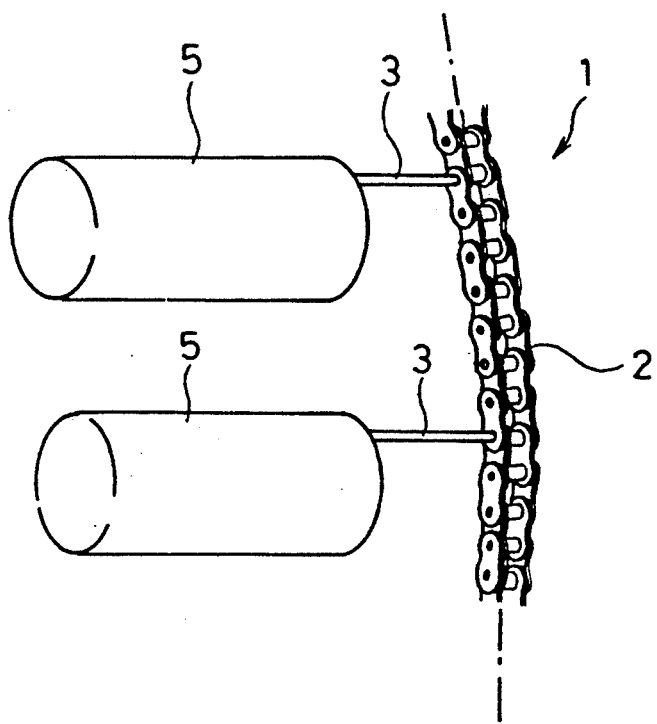
FIG. 5 is a perspective view showing how the can conveying apparatus is used.

It is preferable, therefore, that a sealed chain 2' as shown in FIG. 4 is used if the can conveying apparatus operates in a high-temperature furnace. The sealed chain 2' has inner link plates 6, 6 coupled with each other by means of bush 7 projecting slightly from them. Heat resistant O-rings 17, 17 are fitted onto the projections 7a, 7b of the bushes, encircling them, and pressurized as specified between the inner plate 6 and the outer plate 10. Grease is applied to a clearance between the pin 11 and the bush 7 and sealed with the O-ring 17.

With the heat resistant, sealed chain 2', the can conveying apparatus 1, even if operated in a high temperature furnace, does not see the chain 2 elongate and grease splash. It will not occur that the can drops or is damaged due to the rickety chain, or grease contaminates the can.

In the above-noted embodiments, the truncated cone type is used in the shock absorbing member, but it is possible to use any other type such as a spherical or cylindrical one of any other material than plastics or soft rubber.

The chain can not be restricted to the sealed type chain, but it is possible to use any other chain having many links coupled by pins with each other.

TECHNICAL ADVANTAGES OF THE INVENTION

According to the present invention, the can conveying apparatus 1 has the shock absorbing member 12 fitted onto the top end of the conveying part 3 by way of the spring 13. If the can gets shocked when hanged on the conveying part, the shock will be absorbed, because the shock absorbing member 12 moves longitudinally while pressing the spring 13. It doesn't happen, therefore, that the bottom of the can is dented or the can itself is damaged.

Since the can conveying apparatus has a certain clearance between the smaller-diameter hole 12d of the shock absorbing member 12 and the conveying part 3 and the spring 13 is accommodated in the hole 12b of the shock absorbing member 12, the shock absorbing member can smoothly move longitudinally even if dust gets onto the clearance. If shock arises in the shock absorbing member 12 laterally, it will be absorbed, because the shock absorbing member 12 moves inclinedly, compressing laterally the spring 13. This enables the can to be free from deformation and damage when hanged onto, and escape from falling by reducing shock due to the rickety chain 2.

The spring 13 is contained in the hole 12b of the shock absorbing member 12. This is why the spring 13 is not stained with oil, and dust or paint does not get onto the spring 13. In addition, the shock absorbing member moves slidably for a long period of time. If the shock absorbing member 12 has a truncated cone profile, the can comes into contact with the side 12f of the truncated cone, on the down grade toward the chain 2, which provides a larger contact surface, preventing the can from damage and dropping. If the sealed chain 2, with heat resistant grease sealed by a heat resistant O-ring is used for the can conveying apparatus even running in a high-temperature furnace such as a drying one, it doesn't happen that the chain is elongated and goes rickety and the can falls, is damaged and stained with splashing grease.

What is claimed is:

1. A can conveying apparatus using a chain having many links coupled with pins, comprising;
   a conveying part comprised of an extending pin at a certain pitch from the chain,
   a shock absorbing member having a hole to receive and be attached to the end of the conveying part using a stopper,
   a spring inserted between the bottom of the hole of the shock absorbing member and the conveying part under pressure as specified, and
   a space provided between the end portion of the conveying part and the bottom of the hole to permit the shock absorbing member to axially move and the spring to be pressed.

2. A chain conveying apparatus according to claim 1, wherein the hole of the shock absorbing member is cylindrical where the spring is housed, and smaller in diameter where the conveying part is slidably guided, and
   a clearance is disposed between the narrower portion of the hole and the conveying part to permit the shock absorbing member to move inclinedly along with the spring that bends and deforms.

3. A can conveying apparatus according to claim 1, wherein the shock absorbing member has a truncated cone profile with its smaller-diameter portion toward the chain.

4. A can conveying apparatus according to claim 1, wherein the chain is a roller chain, comprising;
   an inner link having right and left inner link plates coupled by bushes with each other at their front and rear ends and having rollers fitted rotatably onto the bushes,
   an outer link having right and left outer link plates coupled with each other by pins at their front and rear ends, and
   wherein the chain connects a plurality of the outer links and a plurality of the inner links alternatively by inserting the pins into the bush holes.

5. A can conveying apparatus according claim 4, further comprising;
   projecting portions of the bush from the inner link plates at its both ends,
   heat resistant O-rings fitted surrounding the projecting portions and retained between the inner and outer link plates,
   wherein heat resistant grease applied to a clearance between the bush and the pin is sealed with the O-rings.

6. A can conveying apparatus according to claim 1, wherein the shock absorbing member is made of plastics or hard rubber.

7. A can conveying apparatus according to claim 6 wherein the bottom of the hole consists of a metallic cap secured to the hole, and the cap is more concave at the outer surface than the shock absorbing member at the outer edge when the cap is fitted onto the hole.

* * * * *